United States Patent
Desai et al.

(10) Patent No.: US 11,308,696 B2
(45) Date of Patent: Apr. 19, 2022

(54) MEDIA COMPOSITOR FOR COMPUTER-GENERATED REALITY

(71) Applicant: Apple Inc., Cupertino, CA (US)

(72) Inventors: Ranjit Desai, Cupertino, CA (US); Venu M. Duggineni, Santa Clara, CA (US); Perry A. Caro, San Jose, CA (US); Aleksandr M. Movshovich, San Jose, CA (US); Gurjeet S. Saund, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 16/533,053

(22) Filed: Aug. 6, 2019

(65) Prior Publication Data

US 2020/0043237 A1 Feb. 6, 2020

Related U.S. Application Data

(60) Provisional application No. 62/714,869, filed on Aug. 6, 2018.

(51) Int. Cl.
 *G06T 19/00* (2011.01)
 *G10L 25/51* (2013.01)
 (Continued)

(52) U.S. Cl.
 CPC ............ *G06T 19/006* (2013.01); *G06F 3/011* (2013.01); *G06T 3/00* (2013.01); *G06T 9/00* (2013.01);
 (Continued)

(58) Field of Classification Search
 None
 See application file for complete search history.

(56) References Cited

U.S. PATENT DOCUMENTS 9,530,426 B1 * 12/2016 Wright ................ G10L 21/0216
9,871,994 B1 * 1/2018 Vaden ....................... H04N 5/77
(Continued)

FOREIGN PATENT DOCUMENTS

CN 102450010 A 5/2012
CN 107305435 A 10/2017
(Continued)

OTHER PUBLICATIONS

The State Intellectual Property Office of the People's Republic of China, Patent Search Report (with English translation), Chinese Patent Application No. 201910694857.0, 5 pages (dated Jan. 23, 2021).

(Continued)

*Primary Examiner* — Sarah Le
(74) *Attorney, Agent, or Firm* — Thompson Hine LLP

(57) ABSTRACT

One implementation forms a composited stream of computer-generated reality (CGR) content using multiple data streams related to a CGR experience to facilitate recording or streaming. A media compositor obtains a first data stream of rendered frames and a second data stream of additional data. The rendered frame content (e.g., 3D models) represents real and virtual content rendered during a CGR experience at a plurality of instants in time. The additional data of the second data stream relates to the CGR experience, for example, relating to audio, audio sources, metadata identifying detected attributes of the CGR experience, image data, data from other devices involved in the CGR experience, etc. The media compositor forms a composited stream that aligns the rendered frame content with the additional data for the plurality of instants in time, for example, by forming time-stamped, n-dimensional datasets (e.g., images) corresponding to individual instants in time.

18 Claims, 9 Drawing Sheets

(51) Int. Cl.
  *G06F 3/01* (2006.01)
  *H04L 65/60* (2022.01)
  *G06T 3/00* (2006.01)
  *H04L 65/61* (2022.01)
  *G06T 9/00* (2006.01)

(52) U.S. Cl.
  CPC .......... *G10L 25/51* (2013.01); *H04L 65/4069* (2013.01); *H04L 65/607* (2013.01)

(56) References Cited

U.S. PATENT DOCUMENTS

| | | | |
|---|---|---|---|
| 2008/0002878 A1* | 1/2008 | Meiyappan | G06T 7/32 382/154 |
| 2012/0026288 A1* | 2/2012 | Tourapis | H04N 19/154 348/43 |
| 2013/0064285 A1* | 3/2013 | Karlsson | H04N 21/8456 375/240.02 |
| 2013/0070109 A1* | 3/2013 | Gove | H04N 5/347 348/207.1 |
| 2013/0215229 A1 | 8/2013 | Yerli | |
| 2014/0364209 A1* | 12/2014 | Perry | A63F 13/33 463/31 |
| 2017/0061693 A1 | 3/2017 | Kohler et al. | |
| 2017/0251261 A1* | 8/2017 | James | H04N 21/4725 |
| 2017/0301140 A1 | 10/2017 | Smith et al. | |
| 2018/0336929 A1* | 11/2018 | Filippini | H04N 21/4348 |
| 2018/0350032 A1* | 12/2018 | Bastani | G06T 15/20 |

FOREIGN PATENT DOCUMENTS

| | | |
|---|---|---|
| CN | 107424262 A | 12/2017 |
| WO | WO 2015123775 | 8/2015 |
| WO | 2018/080817 A1 | 5/2018 |

OTHER PUBLICATIONS

The State Intellectual Property Office of the People's Republic of China, Notification of the First Office Action (with English translation), Chinese Patent Application No. 201910694857.0, 5 pages (dated Jan. 29, 2021).

* cited by examiner

MEDIA COMPOSITOR FOR COMPUTER-GENERATED REALITY

CROSS-REFERENCE TO RELATED APPLICATION

This Application claims the benefit of U.S. Provisional Application Ser. No. 62/714,869 filed Aug. 6, 2018, which is incorporated herein in its entirety.

TECHNICAL FIELD

The present disclosure generally relates to three dimensional (3D) content, and in particular, to systems, methods, and devices for recording or streaming computer generated reality (CGR) content.

BACKGROUND

Existing computing systems and applications do not adequately facilitate the recording or streaming of CGR content.

SUMMARY

Various implementations disclosed herein include devices, systems, and methods that composite multiple data streams associated with a CGR experience to form a composited stream to facilitate the recording or streaming of CGR content. The composited stream can be stored for playback at a later time or live streamed for live playback on one or more other devices. The composited stream represents CGR content that can be real content by itself, rendered content by itself (e.g., just VR content), 3D representations of content (e.g., an un-rendered model), or combinations thereof.

Some implementations involve performing operations at a device with one or more processors and a computer-readable storage medium. The device obtains a first data stream comprising rendered frames and one or more additional data streams comprising additional data. The rendered frame content (e.g., 2D images or 3D models) represents real content or virtual content rendered in a CGR experience at a plurality of instants in time. The additional data of the one or more additional data streams relates to the CGR experience at the plurality of instants in time. In one example, the additional data is audio from real or virtual audio sources that are part of the CGR experience. In another example, the additional data is metadata identifying a detected attribute of the CGR experience, such as, a real physical property (e.g., illumination, temperature, etc.), a person involved in or detected in the CGR experience, etc. In another example, the additional data is rendered frame content from a second device that is part of the same, shared CGR experience, perhaps from a different viewing perspective.

The device forms a composited stream using the data streams (e.g., using data from both a first data stream and a second data stream). The composited stream aligns the rendered frame content with the additional data for the plurality of instants in time. For example, audio segments may be correlated with corresponding rendered frames that were presented at or around the same instants in time. As another example, metadata regarding the identity of a person is correlated with rendered frames in which the person appears. In some implementations, the composited stream has composited frames that each provide a time-stamped, n-dimensional dataset (e.g., image) corresponding to a single instant in time or time segment. The dimensions of such an n-dimensional dataset/image can correspond to the two or three dimensions of the rendered frames as well as to the additional data (e.g., audio, metadata, captured images, etc.). The composited stream can be stored as a recording of the CGR experience or live streamed to allow others to experience the CGR content via other devices.

Some implementations provide composited streams that include richer information about the CGR experience than the screen and audio capture information of traditional video recording techniques. The composited streams can include information about the 3D geometry of the real or virtual objects in the CGR experience. Including 3D models of real or virtual objects in a composited stream enables an enhanced experience for the viewers of the recording or live streaming, e.g., allowing viewers to experience the scene from different viewpoints than the creator's viewpoint, allowing viewers to move or rotate objects. As another example, including audio source information in a composited stream similarly enables an enhanced experience, e.g., allowing viewers to experience sounds based on their own head orientation, relative positioning to the audio sources, etc.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
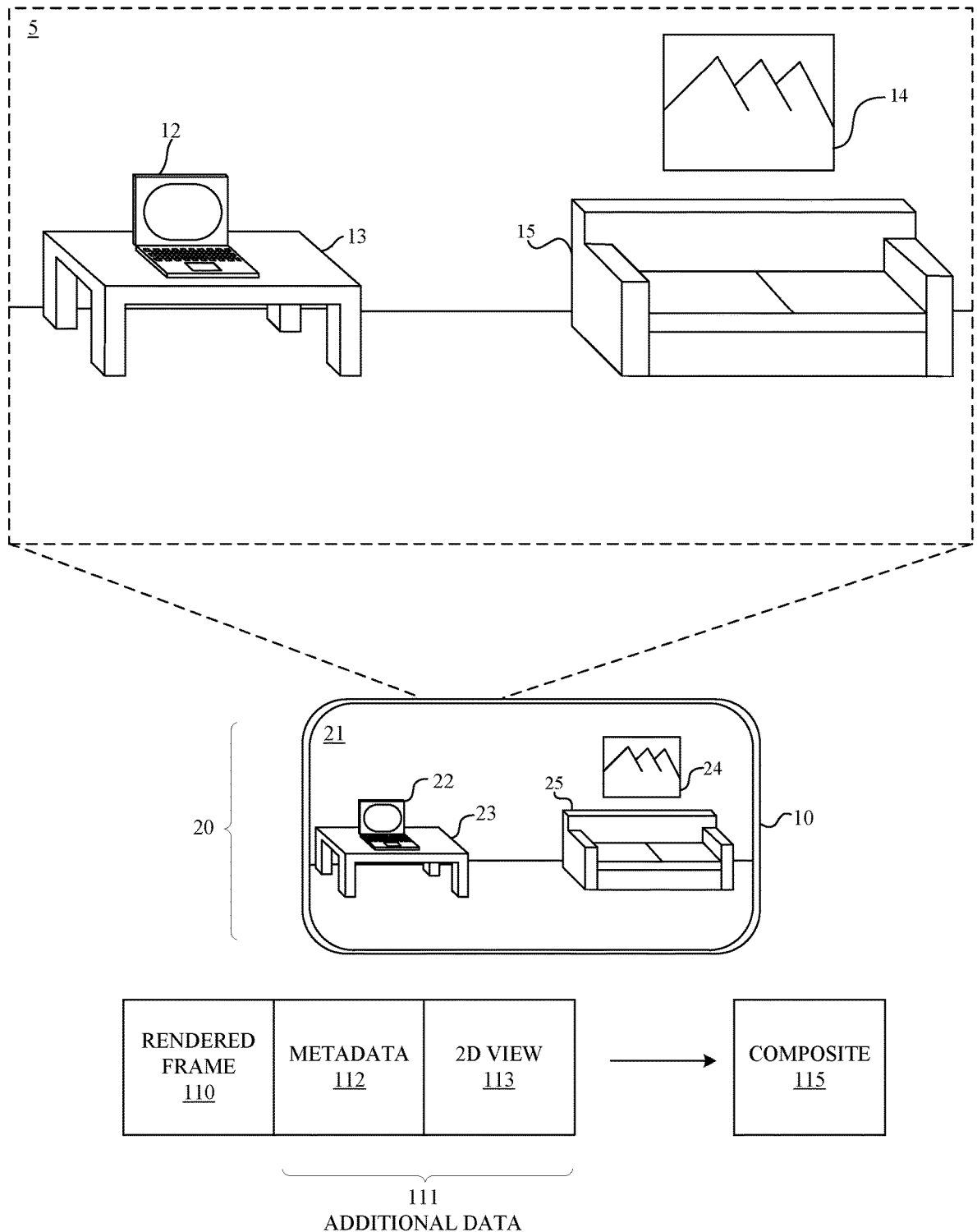
FIG. 1 is a block diagram of an example operating environment in which a device providing a CGR environment creates a composite of the CGR experience for a first instant in time, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Referring to FIG. 1, an example operating environment for some implementations is illustrated. In general, the operating environment includes a device 10 that presents CGR content 20 depicting a CGR environment based on one or more images of a real-world scene 5. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. As used herein, an HMD in which at least some light of the physical environment may pass through a transparent or translucent display is called an "optical see through" HMD.

Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display.

Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment.

Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, the device 10 is a handheld electronic device (e.g., a smartphone or a tablet) configured to present the CGR content 20 to a user. In some implementations, the device 10 is a head-mounted device (HMD) that a user wears. Such an HMD may enclose the field-of-view of the user. In some implementations, an HMD is worn is a way that one or more screens are positioned to display CGR content in the field-of-view of the user. In some implementations, two devices (e.g., an HMD and a controller device in wireless communication with the HMD) communicate with one another to provide the CGR content (e.g., the HMD using cameras and sensors to compile information about the real-world scene 5 and having one or more displays to display the CGR content, and the controller device processing that camera/sensor data and other data to provide the CGR content to the HMD). In some implementations, the device 10 is a chamber, enclosure, or room configured to present the CGR content in which the user does not wear or hold the device 10.

The device 10 is configured to use images or other real world information detected based on a camera or other sensor on the device 10. In some implementations, to provide the CGR content, the device 10 uses at least a portion of one or more camera images captured by a camera. In the example of FIG. 1, the CGR content 20 at a first instant in time 21 includes depictions of items captured by a camera of the device 10. In the example of FIG. 1, the real world scene 5 includes a second device 12 on a desk 13, a wall-hung picture 14, and a sofa 15. The CGR content 20 at the first instant in time 21 includes a second device depiction 22 of the second device 12, a desk depiction 23 of the desk 13, a wall-hung picture depiction 24 of the wall-hung picture 14, and a sofa depiction 25 of the sofa 15.

In FIG. 1, the CGR content 20 at the first instant in time 21 is recorded by compositing the rendered frame 110 and additional data 111 (e.g., metadata 112 and 2D view 113) to create composite 115. The rendered frame 110 includes 2D images or 3D models of the real (if any) and virtual (if any) objects depicted in the CGR content 20 at the first instant in time 21. The metadata 112 includes data descriptive of the real (if any) or virtual (if any) objects depicted in the CGR content. The metadata 112 can be based on camera/sensor data, algorithmic or machine learning interpretation (e.g., voice recognition, object detection, etc.), user input, or any other information detected, recorded, or identified during the CGR experience at our around the CGR content 20 at the first instant in time 21. The 2D view 113 is an image that represents the actual 2D image that was displayed on device 10 depicting the CGR content 20 at the first instant in time 21. In another example, the device 10 presents two simultaneous images (e.g., one for the left eye and one for the right eye) and the 2D view 113 is a cropped image that combines these two images (e.g., providing a single cropped image of the common content of the images). A single cropped image may be desirable, for example, in implementations in which it is desirable to reduce the amount of data in the composite 115, for example, to address bandwidth considerations.

Some implementations described herein enable the recording of CGR content for storage and later re-play or live streaming. For example, a user may use device 10 to have a five minute CGR experience in which the user moves around the real-world scene 5 to view CGR content from different viewpoints, adds, changes, or removes real or virtual objects in the CGR content, or otherwise interacts with the CGR content. The CGR content during this five minute CGR experience is recorded by compositing the data streams associated with the CGR content 20 into a composited stream, e.g., composite 125 and other composites for other instants in time. In some implementations, a first data stream (e.g., rendered frame content such as 3D models of real or virtual objects) and additional data streams (e.g., audio content, metadata, 2D cropped frames, etc.) are combined to form a composited stream of frames that align the rendered frame content with the additional data for the plurality of instants in time (e.g., frames) during the 5 minute experience.

A user may record a CGR experience, upload or stream the composited stream of the CGR content, and others may access and experience the CGR content recording on their own devices. For example, a user may upload/publish a CGR content recording as media on a CGR content sharing website and other users may use the website to access and experience (e.g., using an appropriate viewer or browser plugin) the CGR content recording. The composited stream of CGR content includes rich data about the CGR content, for example, including metadata 112 about properties of the real-world scene 5 (e.g., temperature, lighting, recognized faces, detected objects, detected patterns, etc.), basic or advanced audio information (e.g., audio source information, 16 channel audio, etc.)

The composited stream of CGR content can include rendered frame content that includes the 3D geometry information (e.g., 3D models) that was used in providing the CGR experience as well as 2D views (e.g., the 2D view 113 experienced by the user who created the CGR content recording or combined/cropped views that combine views of a user or multiple users). In one example, the composited stream of CGR content includes a 3D model of the couch 15 that is used to generate the couch depiction 25. The inclusion of this 3D model in the composited stream of CGR content allows other users to view the couch from different viewpoints than the user did when creating the CGR content recording.

Figure 2:
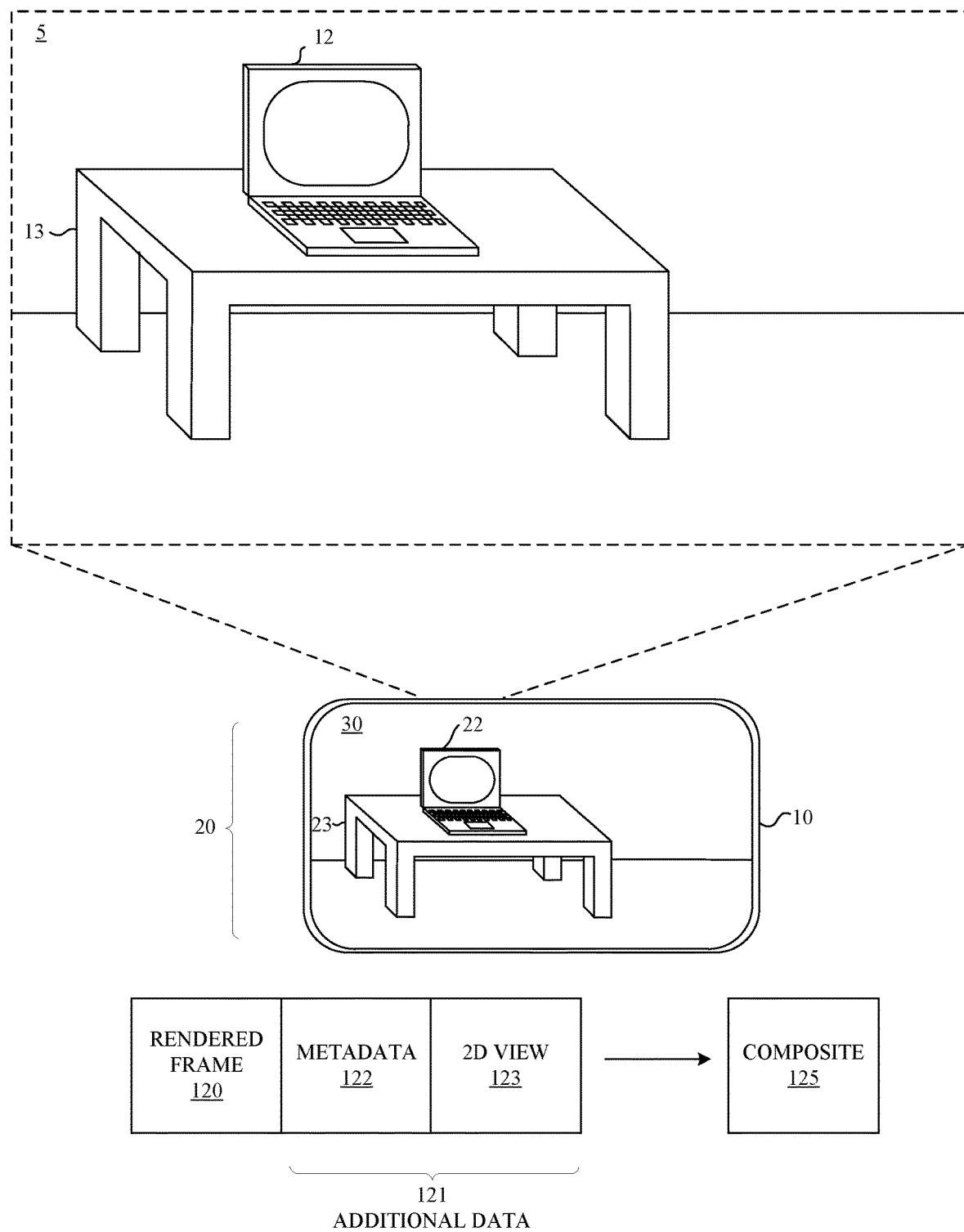
FIG. 2 is a block diagram of the device of FIG. 1 creating a composite of the CGR experience for a second instant in time, in accordance with some implementations.
Figure 3:
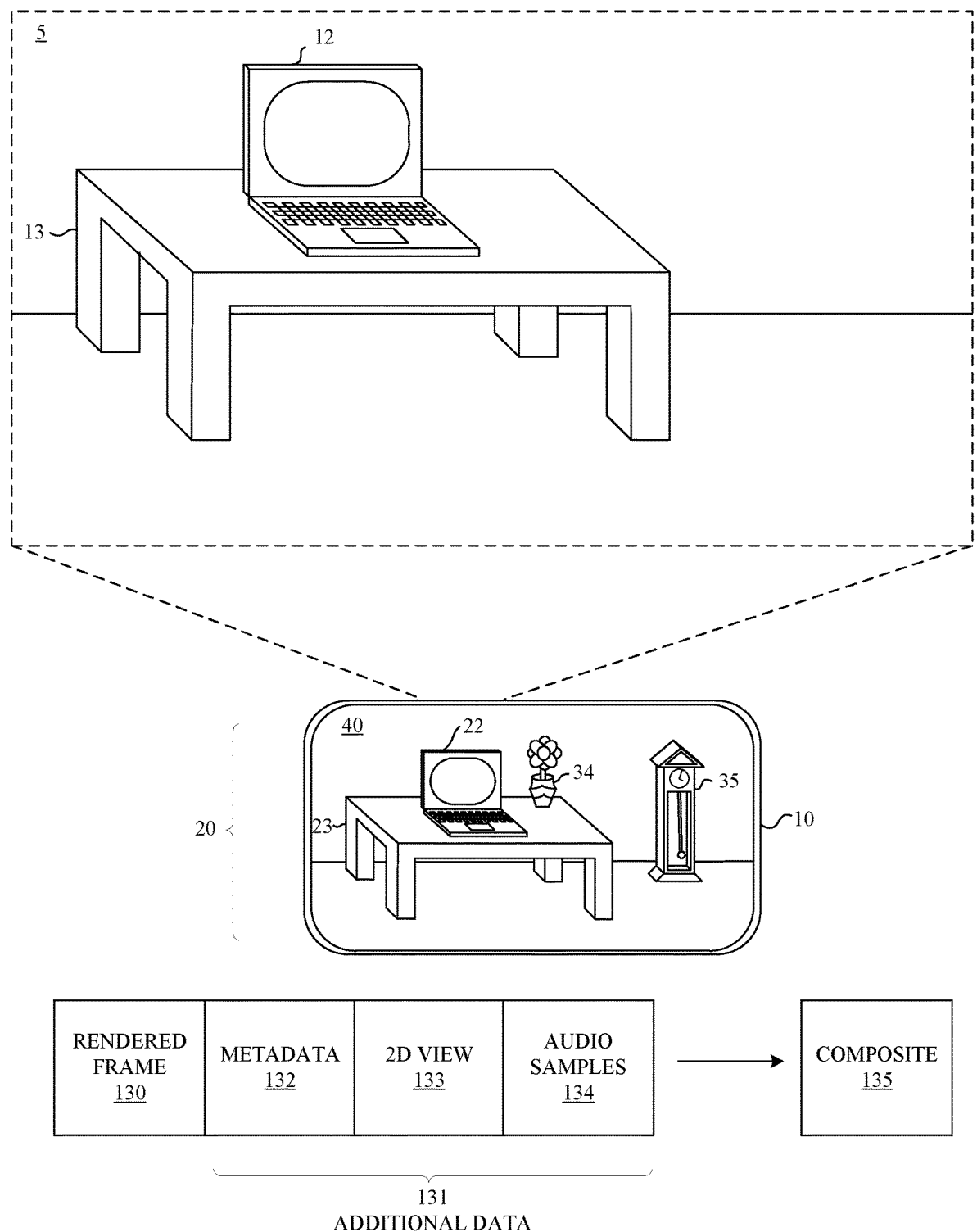
FIG. 3 is a block diagram of the device of FIG. 1 creating a composite of the CGR experience for a third instant in time, in accordance with some implementations.
Figure 4:
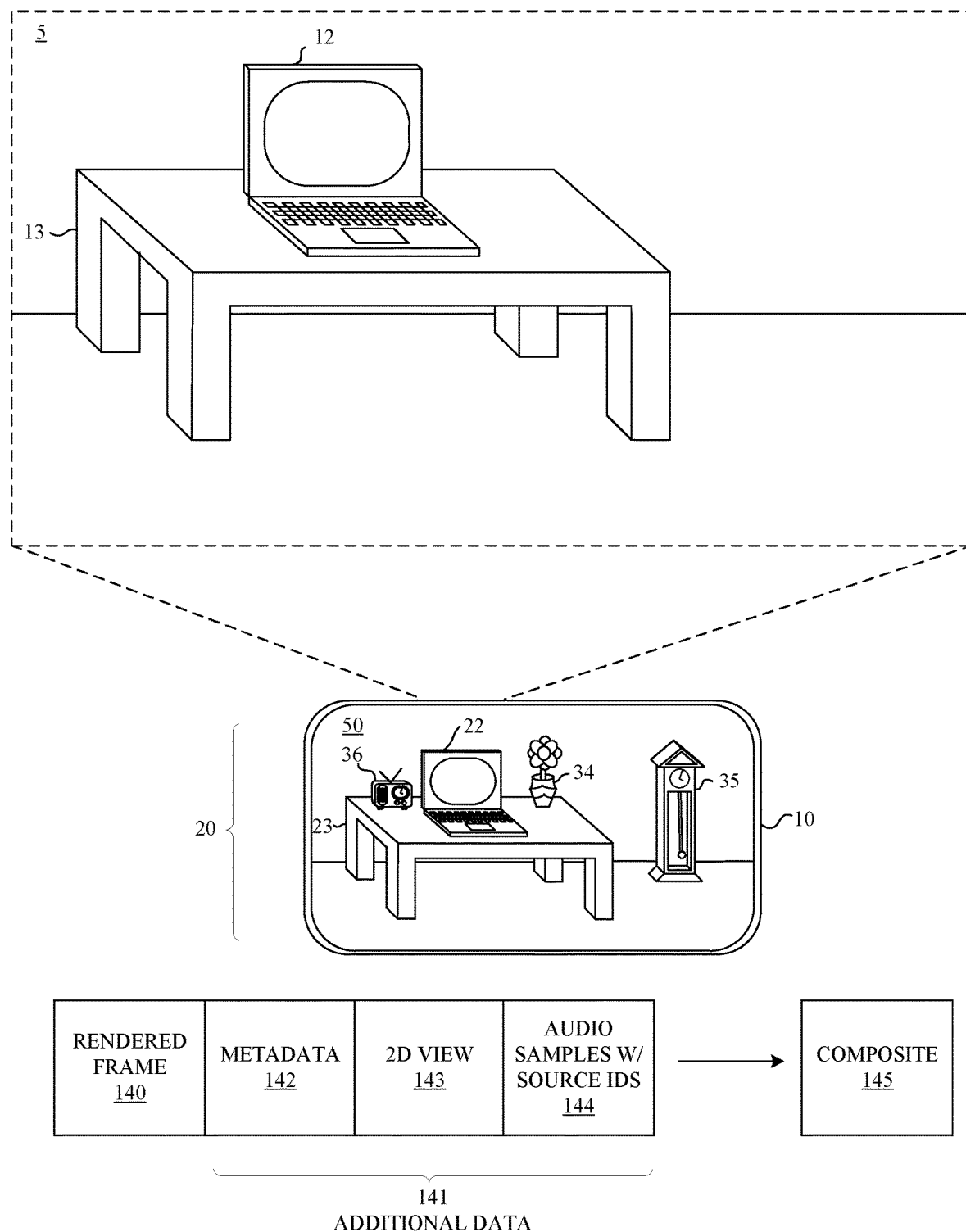
FIG. 4 is a block diagram of the device of FIG. 1 creating a composite of the CGR experience for a fourth instant in time, in accordance with some implementations.

FIGS. 2-4 are block diagrams of the device 10 of FIG. 1 creating composites of the CGR experience for second, third, and fourth instants in time.

FIG. 2 represents a second instant in time 30 following the first instant in time 20 of FIG. 1. The user has changed position relative to the real world scene 5 from the first instant in time 21 to the second instant in time 30 and, in FIG. 2, is closer to the table 13 and second device 12. The depiction of the table 23 and the depiction of the second device 22 are accordingly relatively larger at the second instant in time 30 (FIG. 2) than at the first instant in time 21 (FIG. 1). In FIG. 2, the CGR content 20 at the second instant in time 30 is recorded by compositing the rendered frame 120 and additional data 121 (e.g., metadata 122 and 2D view 123) to create composite 125. The rendered frame 120 includes 2D images or 3D models of the objects depicted in the CGR content 20 at the second instant in time 30. The metadata 122 includes data descriptive of the objects depicted in the CGR content 20 at the second instant in time 30. The 2D view 123 is an image that represents the actual 2D image that was displayed on device 10 depicting the CGR content 20 at the second instant in time 30.

FIG. 3 represents a third instant in time following the second instant in time of FIG. 2. The user has remained in the same position relative position in the real world scene 5 from the second instant in time to the third instant in time. However, the user has added several virtual objects: virtual potted flower 34 and virtual grandfather clock 35. In FIG. 3, the CGR content 20 at the third instant in time 40 is recorded by compositing the rendered frame 130 and additional data 131 (e.g., metadata 132, 2D view 133, and audio samples 134) to create composite 135. The rendered frame 130 includes 2D images or 3D models of the objects depicted in the CGR content 20 at the third instant in time 40. The metadata 132 includes data descriptive of the objects depicted in the CGR content 20 at the third instant in time 40. The 2D view 133 is an image that represents the actual 2D image that was displayed on device 10 depicting the CGR content 20 at the third instant in time 40.

The audio samples 134 include audio streams from two different sources: a first segment of audio of the user's voice (e.g., "I am adding my favorite clock and flowers to add some happiness" and a second segment of audio associated with the virtual grandfather clock 35 (e.g., "tick, tock, tick, tock"). Note that while each audio segment lasts for a length of time, it is associated and included in composite 135 which is, in this implementation, for a single instant in time/composite frame. In some implementations, an audio segment is included in the composite that is associated with an instant in time at which the audio segment begins, the midpoint of the audio segment, the end of the audio segment, or any other predetermined point during the segment. Segments of audio can be broken into sub-portions (e.g., for small time intervals, discrete sounds, sounds between pauses, etc.), combined into more lengthy segments, associated with multiple composites, or otherwise organized within a composite stream to allow both accurate association with other CGR content, smooth playback, and efficient representation of CGR content (e.g., minimizing or reducing unnecessary duplication, etc.).

FIG. 4 represents a fourth instant in time following the second instant in time of FIG. 3. The user has remained in the same position relative position in the real world scene 5 from the third instant in time to the fourth instant in time. However, the user has added another virtual object: virtual clock radio 36. In FIG. 4, the CGR content at the fourth instant in time 50 is recorded by compositing the rendered frame 140 and additional data 141 (e.g., metadata 142, 2D view 143, and audio samples with source ID 144) to create composite 145. The rendered frame 140 includes 2D images or 3D models of the objects depicted in the CGR content at the fourth instant in time 50. The metadata 142 includes data descriptive of the objects depicted in the CGR content at the fourth instant in time 50. The 2D view 143 is an image that represents the actual 2D image that was displayed on device 10 depicting the CGR content at the fourth instant in time 50.

The audio samples with source IDs 144 include audio streams associated with two different sources: a first segment of audio of the virtual clock radio 36 (e.g., music) and a second segment of audio associated with the virtual grandfather clock 35 (e.g., "tick, tock, tick, tock"). The sources of these different audio segments are distinguished from one another and identified in the audio samples with source IDs 144. The sources may identify or be usable to identify the locations of sound producing objects within a 3D model, e.g., relative to a 3D coordinate system. When the CGR content recording is later experienced by other users, these source locations relative to the users' head positions and orientations can be used to improve their experiences. For example, another user experiencing the CGR content recording may individually control the audio sources, for example, to turn off the music coming from the virtual clock radio 36.

CGR content such as the CGR content recorded in the example of FIGS. 1-4 can include any type of 2D or 3D objects, including real or virtual content. Examples of 2D and 3D content include, but are not limited to, a table, a floor, a wall, a desk, a book, a body of water, a mountain, a field, a vehicle, a counter, a human face, a human hand, human hair, another human body part, an entire human body, an animal or other living organism, clothing, a sheet of paper, a magazine, a book, a vehicle, a machine or other man-made object, and any other item or group of items that can be identified and represented. 2D or 3D objects can additionally or alternatively include created content that may or may not correspond to real world content including, but not limited to, aliens, wizards, spaceships, unicorns, and computer-generated graphics and models.

Figure 5A:
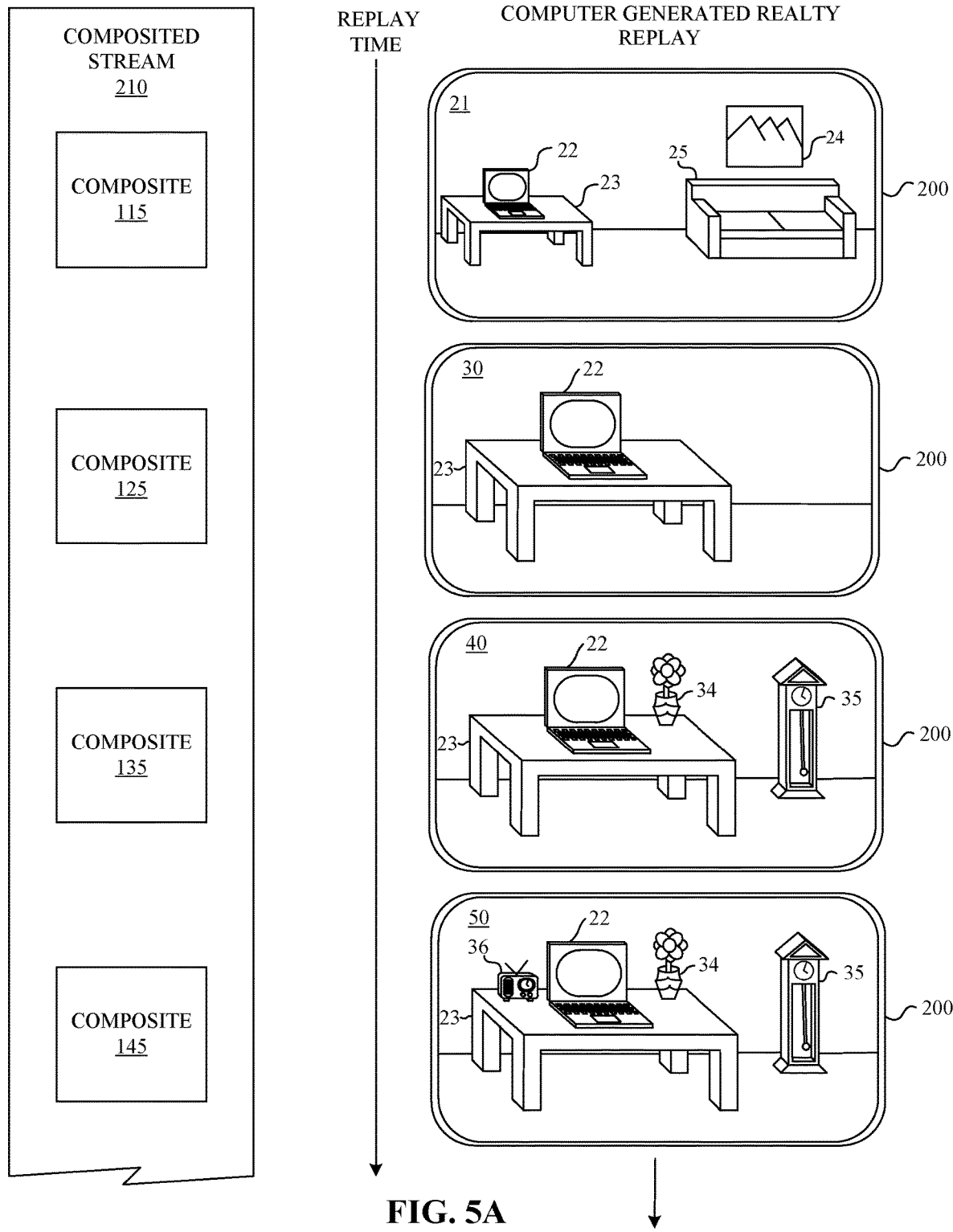
FIG. 5A is a block diagram of a composited stream based on the composites of FIGS. 1-4 and replay of the CGR experience using the composite stream, in accordance with some implementations.

FIG. 5A is a block diagram of a composited stream 210 based on the composites 115, 125, 135, 145 of FIGS. 1-4 and replay of the CGR experience using the composite stream 210 on another device 200. In this example, each composite 115, 125, 135, 145 includes the CGR content associated with a respective instant in time to be experienced one after the other in a sequence. Thus during replay the user experiences the CGR content 20 from the first instant in time 21, the CGR content 20 from the second instant in time 30, the CGR content 20 from the third instant in time 40, and then the CGR content 20 from the fourth instant in time 50 in a sequence. In some implementation, each of the composites 115, 125, 135, 145 corresponds to a frame of CGR content and these frames are sequentially played at set time intervals, e.g., the first CGR frame is played for 1/24 seconds, then replaced with the second CGR frame which is played for 1/24 seconds and then replaced, etc.

Figure 5B:
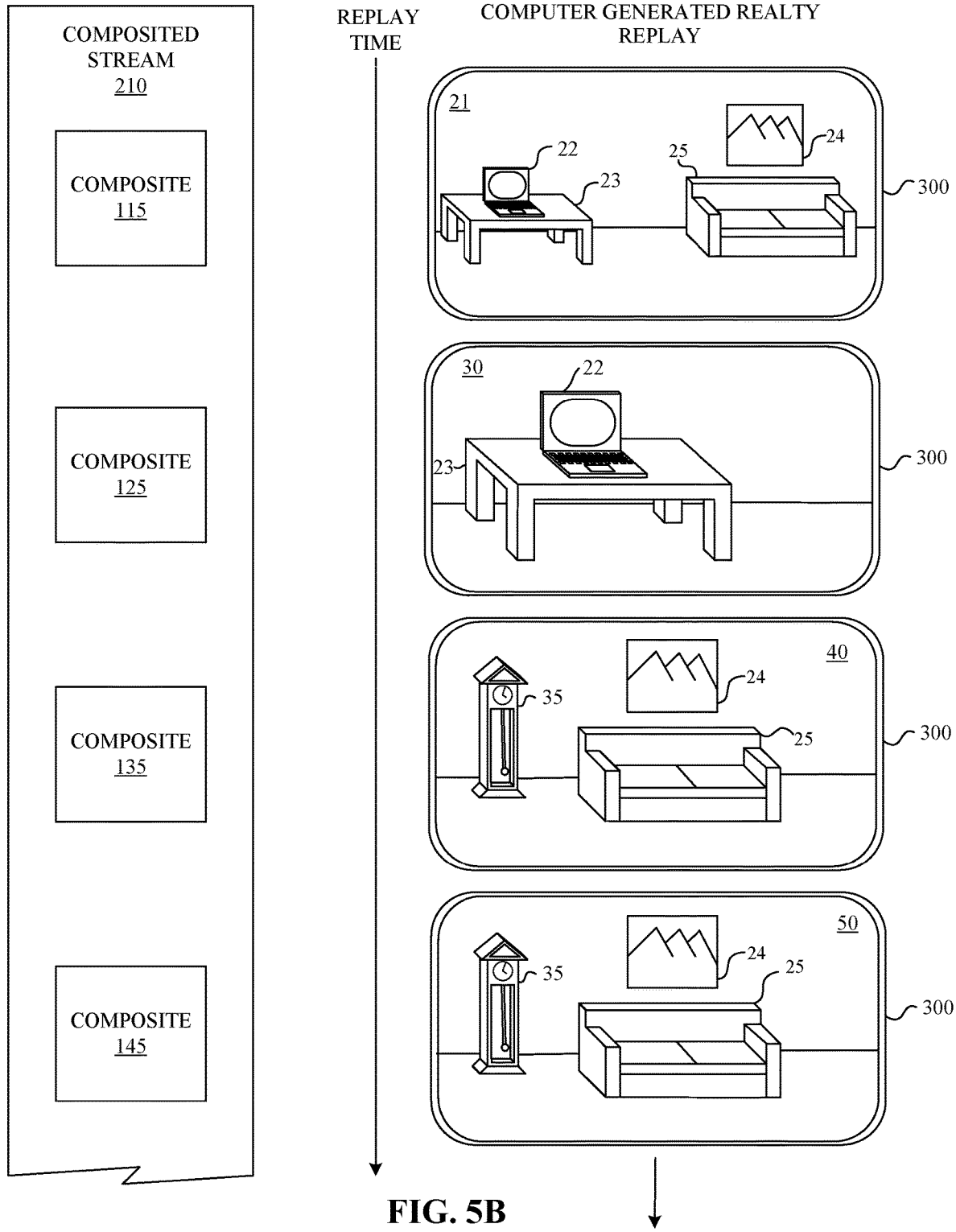
FIG. 5B is a block diagram of the composited stream and replay of the CGR experience using the composite stream on yet another device.

In FIG. 5A, the views of the CGR content are the same during replay as the views of the CGR content at the first-fourth instants in time 20, 30, 40, 50 viewed by the user who created the composite stream 210 of the CGR content. However, in other implementations, the views of the CGR content are different during replay than during composite stream 210 creation. In some implementations, the visual appearance of the CGR content for a stream recipient/replay user depends upon that user's own viewpoint (e.g., position, movement, or orientation in a 3D space), which may be different from the viewpoint of the user who created composite stream 210 of the CGR content. In some implementations, 3D geometry information in the composite stream 210 and viewer position information are used to create views of 3D content that differ from the views of the 3D content viewed by the user that create the CGR content recording. In some implementation, the composite stream includes 3D geometry information of real objects that is determined based on information in addition to information about the current instant in time. For example, the 3D geometry information can be determined based on multiple captured images (e.g., for multiple rendered frames over multiple instants in time during the CGR experience) that can be used to adapt a view of the CGR content for any instant in time. FIG. 5B provides an example of using 3D geometry information in this way.

FIG. 5B is a block diagram of the composited stream 210 and replay of the CGR experience using the composite stream 210 on another device 300. During replay, the user experiences the CGR content 20 from the first instant in time 21, the CGR content 20 from the second instant in time 30, the CGR content from the third instant in time 40, and then the CGR content from the fourth instant in time 40 in a sequence. In this example, the 3D geometry of the couch 25 was determined from an image captured of the real-world scene 5 for the first instant in time 21 depicted in FIG. 1 and from additional images of the couch 25 during other (previous or later) instants of time during the CGR experience. In this example, during replay at the third instant in time, the user has rotated his head right to change his view in the CGR replay experience. As a result, the device 300 presents views of the CGR content at the third and fourth instants in time 40, 50, including a view of depictions 25, 24 of the couch 15 and wall-hung painting 14. These views are presented for the CGR content at the third and fourth instants in time even though the couch 15 and wall-hung painting 44 were depicted in the views that were displayed to the user who created the composite stream during the third and fourth instants of time (e.g., FIGS. 3 and 4). In this example, the couch 15 and the wall-hung painting 14 were not captured by the camera at the third and fourth instants in time, yet are available to be viewed as part of the CGR content for the third and fourth instants in time 40, 50.

In some implementations, a replay of a CGR experience using a composited stream involves removing or obscuring objects (e.g., real world objects). For example, the real painting 24 may be removed or overlaid with a virtual painting or wallpaper covering the entire wall behind it. In some implementations, a replay of a CGR experience using a composited stream involves movement of objects instead of, or in combination with movement of the viewer. For example, if a real dog walks across the scene from left to right, or if a virtual cat walks across the scene from right to left, both would be composited in the recording and could be experienced during the replay.

Figure 6:
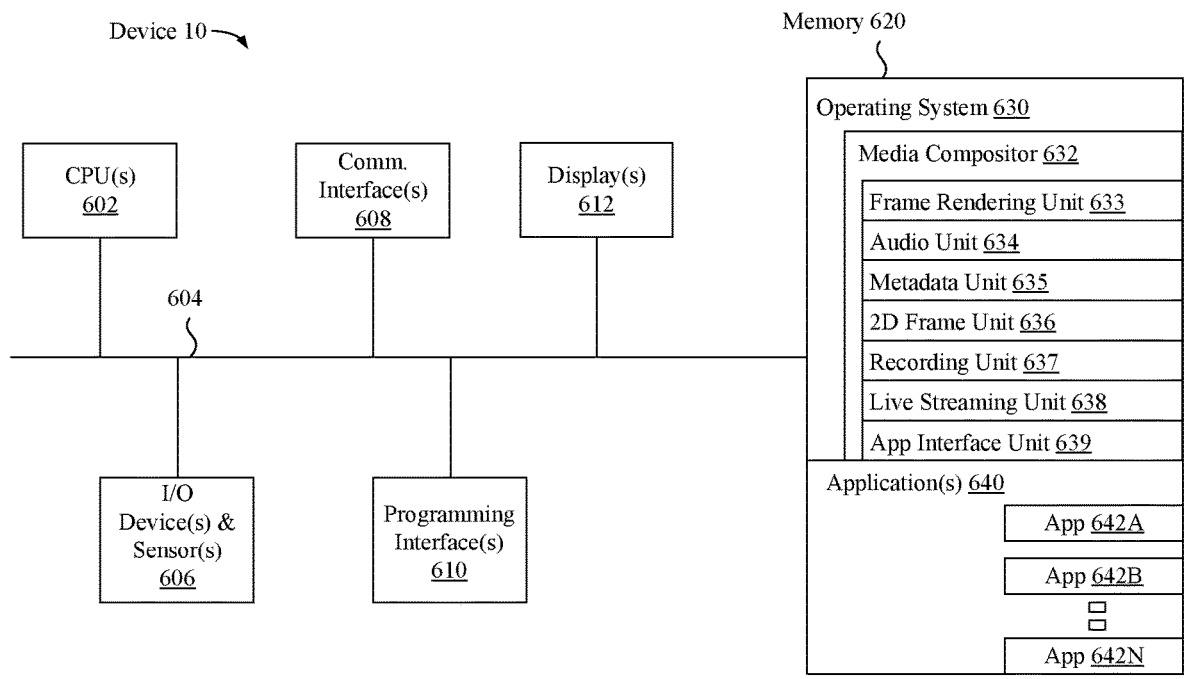
FIG. 6 is a block diagram illustrating device components of an exemplary device according to some implementations.

FIG. 6 is a block diagram illustrating device components of a device 10 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processing units 602 (e.g., microprocessors, ASICs, FPGAs, GPUs, CPUs, processing cores, or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 610, one or more displays 612, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of a touch screen, a softkey, a keyboard, a virtual keyboard, a button, a knob, a joystick, a switch, a dial, an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), one or more cameras, or the like. In some implementations, movement, rotation, or position of the device 10 detected by the one or more I/O devices and sensors 606 provides input to the device 10.

In some implementations, the I/O devices and sensors 606 are configured to obtain image data that corresponds to at least a portion of a scene local to the device 10. The I/O devices and sensors 606 can include one or more RGB cameras (e.g., with a complimentary metal-oxide-semiconductor (CMOS) image sensor or a charge-coupled device (CCD) image sensor), monochrome camera, IR camera, event-based camera, or the like. In various implementations, the I/O devices and sensors 606 further include illumination sources that emit light, such as a flash.

In some implementations, the one or more displays 612 are configured to present the CGR content. In some implementations, the one or more displays 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 612 correspond to diffractive, reflective, polarized, holographic, etc. waveguide displays. In one example, the device 10 includes a single display. In another example, the device 10 includes a display for each eye.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 comprises a non-transitory computer readable storage medium. In some implementations, the memory 620 or the non-transitory computer readable storage medium of the memory 620 stores the following programs, modules and data structures, or a subset thereof including an optional operating system 630 and one or more applications 640.

The operating system 630 includes procedures for handling various basic system services and for performing hardware dependent tasks. In some implementations, the operating system 630 includes a Media Compositor 632 that is configured to provide or record a CGR experience. In this example, the Media Compositor 632 includes a Frame Rendering Unit 633 configured to create or display frames of 2D images or 3D models. The Frame Rendering Unit 633 may receive images and other sensor information from I/O Device(s) and Sensor(s) 606, create 3D models of real-world objects, combine real world content, e.g., 3D models, with virtual content, and determine views of 3D content, e.g., for display on display(s) 612.

The Media Compositor 632 also includes an Audio Unit 634 configured to capture audio samples, convert audio samples between formats, or determine audio source information. The Media Compositor 632 also includes a Metadata Unit 635 configured to derive metadata, for example, from data from I/O Device(s) and Sensor(s) 606 during a CGR experience.

The Media Compositor 632 also includes 2D Frame Unit 636 to capture or convert images displayed on display(s) 612 during the recording of a CGR experience. In some implementations, the 2D Frame Unit 636 provides an image frame for a right eye view and an image frame for a left eye view. In some implementations, the 2D Frame Unit creates a single cropped frame (e.g., having a 90 degree field of view) by finding a central region in both an image frame for a right eye view and an image frame for a left eye view. This combination/cropping can be implemented as an optimization to conserve bandwidth and can be implemented selectively based on bandwidth conditions or user preferences.

The Media Compositor 632 also includes a Recording Unit 637 configured to store a composite stream of composites of CGR content, for example, on a computer-readable medium. The Media Compositor 632 also includes a Live Streaming Unit 638 configured to encode the composite stream of composites of CGR content in a live streaming format, for example, for distribution over a network to other users. The Media Compositor 632 also includes an App Interface Unit 639 configured to include app content and interactions in the CGR content and/or to allow an app to provide, control, use, record, or stream the CGR content.

In some implementations, each of the one or more applications 640, e.g., apps 642a-n, provides virtual content that is included in a CGR experience. For example, a grandfather clock app may provide virtual content, e.g., depiction of grandfather clock 35 (FIG. 4) and its associated functions and interactivity, e.g., swinging arm, tick-tock sound, user-controlled time settings, etc. These apps 642a-n provide separate sources of content that can be included in a shared virtual platform that provides a CGR experience. The Media Compositor 632 is configured to receive, display, and record information about the virtual objects provided by apps 642a-n for inclusion in composition streams of CGR content.

In some implementations, the device 10 is a head-mounted device (HMD). Such a HMD can include a housing (or enclosure) that houses various components of the HMD. The housing can include (or be coupled to) an eye pad disposed at a proximal (to the user) end of the housing. In some implementations, the eye pad is a plastic or rubber piece that comfortably and snugly keeps the HMD in the proper position on the face of the user (e.g., surrounding the eye of the user). The housing can house a display that displays an image, emitting light towards one or both of the eyes of a user.

FIG. 6 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules/units and the division of particular functions and how features are allocated among them will vary from one implementation to another and, in some implementations, depends in part on the particular combination of hardware, software, or firmware chosen for a particular implementation.

Figure 7:
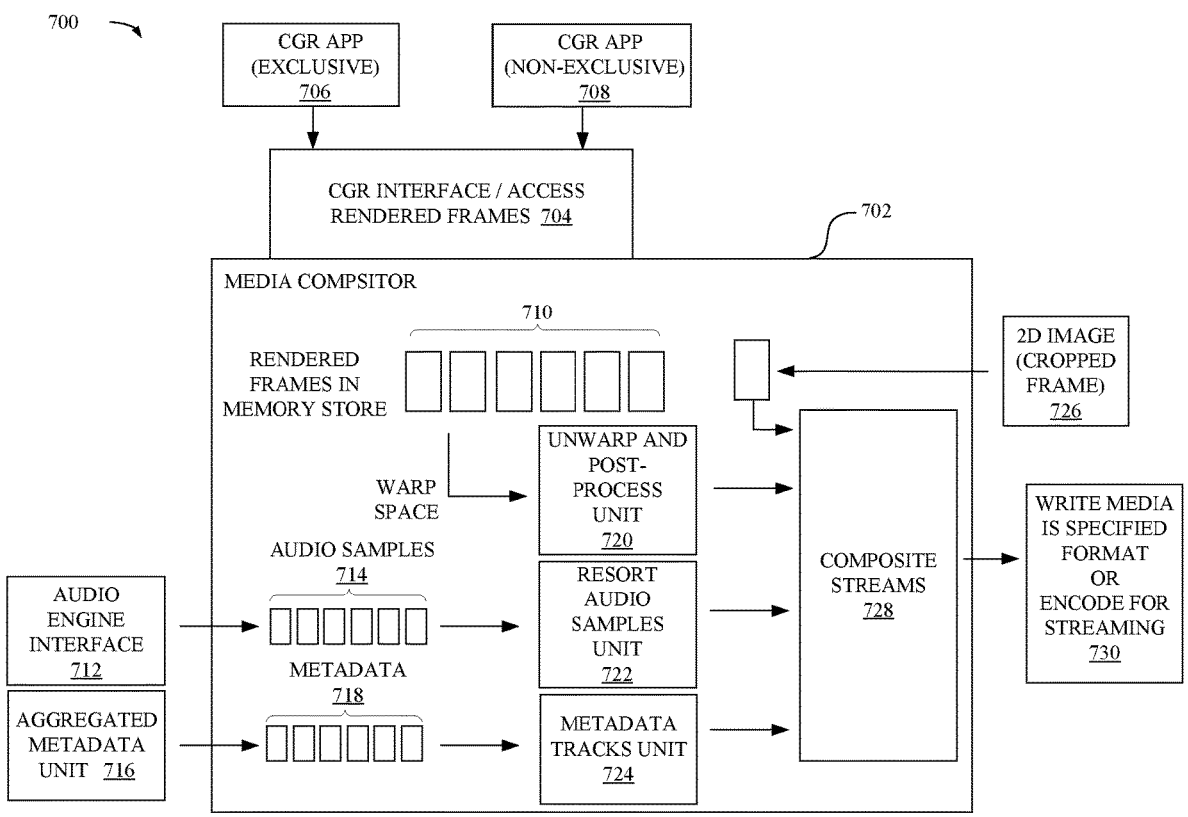
FIG. 7 is a block diagram illustrating an exemplary media compositor in according to some implementations.

FIG. 7 is a block diagram illustrating a system 700 that includes an exemplary media compositor 702 that combines rendered frames, audio, metadata, and 2D images to provide n-dimensional, composite streams of CGR content. In this example, some of the CGR content elements of the CGR experience are received from apps (e.g., apps 642a-n of FIG. 6). Two types of apps, exclusive apps and non-exclusive apps, can provide virtual content that is included in the CGR content. Exclusive apps, such as CGR app 706, may execute within a CGR shared space framework and use all of the resources of the framework while executing, e.g., using the entire view of the CGR content being displayed. In contrast, non-exclusive apps, such as CGR app 708, may share the resources of the framework while executing, e.g., an app may provide a grandfather clock virtual object while another app provides a clock radio virtual object on the CGR shared space framework.

The CGR interface/access rendered frames unit 704 accesses information about rendered frames of the CGR content from a reality engine or other unified rendering unit. Examples of rendered frames 110, 120, 130, 140 are depicted in FIGS. 1-4. The reality engine [not shown] or other unified rendering unit [not shown] creates rendered frames of CGR content. In some circumstances, the rendered frames are created by combining virtual objects (from apps or other sources) with real world objects to create one or more 3D models or by overlaying virtual objects on 2D images of the real-world scene. The CGR interface/access rendered frames unit 704 may receive rendered frames from multiple sources in some implementations, for example, from a reality engine and from a separate unified rendering unit. In some implementations, the output of each of multiple sources is a frame with one object, which could be the 3D geometry of that object, metadata associated with the object, or other information. For example, a reality engine may render a sandwich box and a unified rendering engine may render a bottle and both may be accessed by the CGR interface/access rendered frames unit 704 for inclusion in the composite streams 728. The information about both objects is fed into (or retrieved by) the media compositor 702 and stored as rendered frames 704 in a memory store. Accordingly, each of the rendered frames 704 in the memory store can include more information than just a 2D image. In some implementations, the information has the form of an n-dimensional image associated with a single instant in time, e.g., timestamped based on the start of the CGR content recording process.

The media compositor 702 also receives additional data streams with additional data. Examples of audio samples 114, 124, 134, 144 are depicted in FIGS. 1-4. Audio engine interface 712 provides audio samples 714. The audio samples 714 may be spatialized audio samples. In some implementations, the spatialized audio samples are used directly as input to composite the composite streams 728. Thus, if 5 people are talking within the CGR content, an audio spatializer may blend all the sound samples based on position of source so that if a user turns her head she will hear certain sounds better depending upon the spatialization. In other implementations, as shown in FIG. 7, a resort audio samples unit 722 within the media compositor 702 un-spatializes the spatialized audio samples to their individual sources, for example, by applying a transformation to identify audio sources associated with particular audio segments. The user may then be able to control the sounds individually based on their sources, e.g., turning up the volume of the clock radio while turning off the tick-tock sound of the grandfather clock, etc.

The media compositor 702 also receives metadata 718 from aggregated metadata unit 716. Examples of metadata 112, 122, 132, 142 are depicted in FIGS. 1-4. The metadata 718 is associated with particular tracks by metadata tracks unit 724. The media compositor 702 further receives 2D images (e.g., cropped frames). Examples of 2D views 113, 123, 133, 143 are depicted in FIGS. 1-4. The rendered frames 710, audio samples 714, metadata 718, and 2D images 726 are input to form composite streams 728.

The rendered frames 710 may be processed before being input to create the composite streams 728. In this example, the media compositor 702 includes an un-warp and post-process unit 720 that can be configured to perform various types of post processing. For example, the un-warp and post-process unit 720 may unwarp foveated content in a rendered frame so that the composite stream will not be limited by the foveation. This can involve reconstructing the original unfoveated version of the content by applying an inverse transform and applying a defect removal process. In another example, the un-warp and post-process unit 720 converts content from spherical coordinate space into rectangular coordinate space.

The composite streams 728 combine the rendered frames 710, audio samples 714, metadata 718, and 2D images 726. The composite streams may index the CGR content for retrieval and include logic for combining the CGR content. The media compositor 702 can write the composite streams 728 in a specified format (e.g., for storage on a non-transitory computer-readable medium) or encode the composite streams 728 for live streaming, as shown in block 730. In the case of live streaming, the media compositor 702 can identify CGR content blocks (e.g., frames, slices, etc.) associated with one or more instants of time and send the CGR content blocks at specified intervals.

Figure 8:
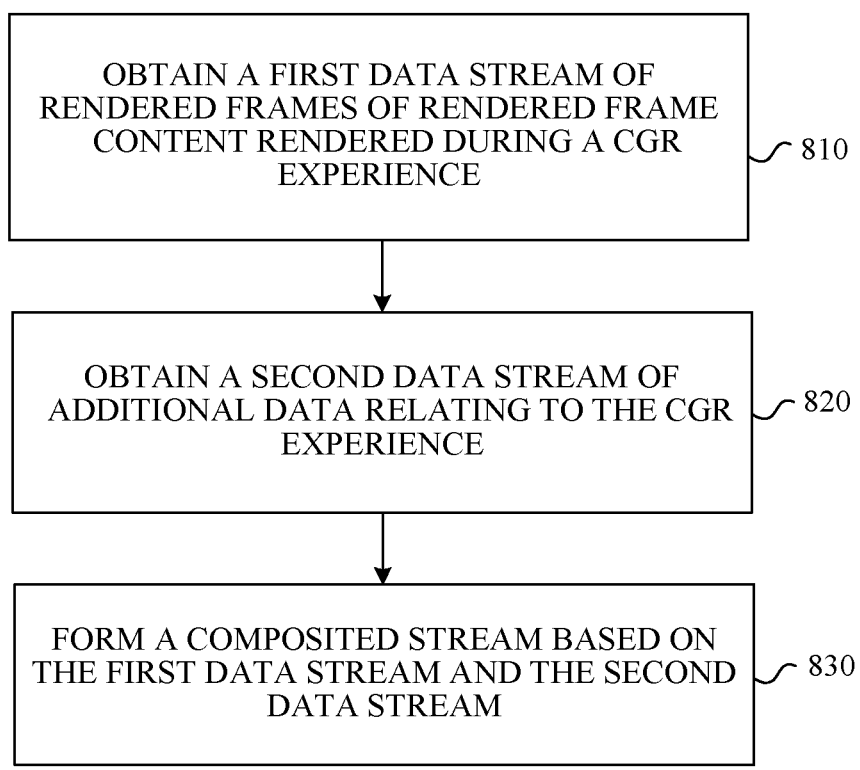
FIG. 8 is a flowchart representation of a method for creating a composite stream using multiple data streams associated with a CGR experience.

FIG. 8 is a flowchart representation of a method for creating a composite stream using multiple data streams associated with a CGR experience. In some implementations, the method 800 is performed by a device (e.g., device 10 of FIGS. 1-6). The method 800 can be performed at a mobile device, HMD, controller device, desktop, laptop, server device, or on a combination of one or more of such devices. The method 800 can be performed on a HMD that has a screen for displaying 2D images or a screen for viewing stereoscopic images. In some implementations, the method 800 is performed by processing logic, including hardware, firmware, software, or a combination thereof. In some implementations, the method 800 is performed by a processor executing code stored in a non-transitory computer-readable medium (e.g., a memory).

At block 810, the method 800 obtains a first data stream of rendered frames of rendered frame content rendered during a CGR experience. The rendered frame content represents real content or virtual content rendered at a plurality of instants in time during the CGR experience. Examples rendered frames include the exemplary rendered frames 110, 120, 130, 140 depicted in FIGS. 1-4. In some implementations, virtual content is provided by an app executing that has exclusive use of CGR resources of the CGR framework, an app executing that shares use of CGR resources of the CGR framework with other apps, or a combination of such apps.

At block 820, the method 800 obtains a second data stream of additional data relating to the CGR experience. The additional data relates to the instants in time during the CGR experience, e.g., when audio begins, when an object is introduced for which metadata is determined, etc. In some implementations, the second data stream is an audio data stream, for example, audio samples 114, 124, 134, 144 of FIGS. 1-4. The method 800 may identify real or virtual audio sources producing audio during the CGR experience. In some implementations, the second data stream is a metadata stream providing metadata associated with individual instants in time of the plurality of instants in time, e.g., the names of peoples whose faces are detected within a threshold time of an instant in time, the identity of a real object (e.g., body part, table, painting, etc.) detected in the CGR experience at an instant in time, the identity of virtual objects included in the CGR experience at an instant in time, the temperature or illumination detected by a temperature sensor or illumination sensor at an instant in time, etc. For example, the second data stream may comprise the metadata 112, 122, 132, 142 depicted in FIGS. 1-4.

In some implementations, the second stream includes a frame stream of 2D views of the CGR experience associated with particular user viewpoints for the plurality of instants in time, e.g., showing what the user who created the CGR content recording actually viewed on his own device. For example, the second stream may include the 2D views 113, 123, 133, 143 (e.g., screenshots/image captures) depicted in FIGS. 1-4 and displayed on device 10 at those instants in time 21, 30, 40, 50. The frame stream may include cropped frames, each formed by identifying a common portion of a left eye view and a right eye view of the CGR experience.

In some implementations, the second stream includes rendered content of the CGR experience from a second device separate from the device. For example, two users may be experiences a shared CGR experience from different positions within a scene. The rendered frames from their respective devices may be combined into a single composite stream for the CGR experience.

At block 830, the method 800 forms a composited stream based on the first data stream and the second data stream. The composited stream aligns the rendered frame content with the additional data to record CGR content for the plurality of instants in time. The method 800 can record the CGR experience by recording the composited stream on a non-transitory computer-readable medium. FIGS. 5A and 5B illustrate examples of forming a composted stream. The method 800 can live stream the CGR experience by encoding the composited stream according to a predetermined live streaming format. The composited stream can include three dimensional (3D) models representing 3D geometries of the virtual content or the real content of the CGR experience. The composited stream can include composited frames that each have a time-stamped n-dimensional image corresponding to a single instant in time.

The method 800 provides numerous benefits. For example, by forming a composited stream from two or more other streams, the method produces content that can easily be provided, stored, or accessed by other users or at later times. For example, a player application integrated within a webpage may be configured with a plugin or other functionality to play or replay a CGR experience from a composited stream. The composited stream can provide a single source having a known format that captures rich information from a recorded/streamed CGR experience.

Numerous specific details are set forth herein to provide a thorough understanding of the claimed subject matter. However, those skilled in the art will understand that the claimed subject matter may be practiced without these specific details. In other instants, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a device having a processor and a computer-readable storage medium:

obtaining a first data stream comprising rendered frames, the rendered frames comprising rendered frame content representing real content and virtual content rendered during a user experience at a plurality of instants in time for at least two different viewpoints;

obtaining a second data stream comprising additional data relating to the user experience at the plurality of instants in time and based on the at least two different viewpoints; and forming a composited stream based on the first data stream and the second data stream for the at least two different viewpoints rendered during the user experience, wherein the composited stream:

comprises composited frames that each comprise a time-stamped n-dimensional image corresponding to a single instant in time, aligns the rendered frame content with the additional data to record content for the plurality of instants in time, and comprises another viewpoint of the recorded content for a viewer, wherein the another viewpoint is a different viewpoint than the at least two different viewpoints rendered during the user experience.

2. The method of claim 1 further comprising recording the user experience by recording the composited stream on a non-transitory computer-readable medium.

3. The method of claim 1 further comprising live streaming the experience by encoding the composited stream according to a predetermined live streaming format.

4. The method of claim 1, wherein the composited stream comprises three dimensional (3D) models representing 3D geometries of the virtual content or the real content.

5. The method of claim 1, wherein the additional data comprises audio.

6. The method of claim 1 further comprising identifying real or virtual audio sources producing audio during the user experience, wherein the composited stream identifies the real or virtual audio sources.

7. The method of claim 1, wherein the additional data comprises metadata associated with individual instants in time of the plurality of instants in time.

8. The method of claim 7, wherein the metadata identifies a real physical property of the user experience.

9. The method of claim 7, wherein the metadata identifies a person detected via computer-implemented object detection.

10. The method of claim 7, wherein the metadata identifies a body part of a user detected via computer-implemented object detection.

11. The method of claim 1, wherein the additional data comprises second rendered content of the user experience from a second device separate from the device.

12. The method of claim 1, wherein the virtual content is provided by an app executing within a framework that provides the user experience, wherein the app has exclusive use of resources of the framework.

13. The method of claim 1, wherein the virtual content is provided by an app executing within a framework that provides the user experience, wherein the app shares use of resources of the framework with other apps.

14. The method of claim 1 further comprising applying an inverse transform to unwarp foveated images in the rendered frames to produce un-foveated images, wherein the composited stream comprises the un-foveated images.

15. The method of claim 1, wherein the device is a head-mounted device (HMD), a controller communicative coupled to the HMD in the same physical environment as the HMD, or a server communicatively coupled to the HMD in a separate physical environment from the HMD.

16. The method of claim 1, wherein the second data stream comprises a frame stream of 2D views of the user experience associated with user viewpoints for the plurality of instants in time and cropped frames each formed by identifying a common portion of a left eye view and a right eye view of the user experience.

17. A system comprising:

a non-transitory computer-readable storage medium; and one or more processors coupled to the non-transitory computer-readable storage medium, wherein the non-transitory computer-readable storage medium comprises program instructions that, when executed on the one or more processors, cause the system to perform operations comprising:

obtaining a first data stream comprising rendered frames, the rendered frames comprising rendered frame content representing real content and virtual content rendered during a user experience at a plurality of instants in time for at least two different viewpoints;

obtaining a second data stream comprising additional data relating to the user experience at the plurality of instants in time and based on the at least two different viewpoints; and forming a composited stream based on the first data stream and the second data stream for the at least two different viewpoints rendered during the user experience, wherein the composited stream:

comprises composited frames that each comprise a time-stamped n-dimensional image corresponding to a single instant in time, aligns the rendered frame content with the additional data to record content for the plurality of instants in time, and comprises another viewpoint of the recorded content for a viewer, wherein the another viewpoint is a different viewpoint than the at least two different viewpoints rendered during the user experience.

18. A non-transitory computer-readable storage medium, storing program instructions computer-executable on a computer to perform operations comprising:

obtaining a first data stream comprising rendered frames, the rendered frames comprising rendered frame content representing real content and virtual content rendered during a user experience at a plurality of instants in time for at least two different viewpoints;

obtaining a second data stream comprising additional data relating to the user experience at the plurality of instants in time and based on the at least two different viewpoints; and forming a composited stream based on the first data stream and the second data stream for the at least two different viewpoints rendered during the user experience, wherein the composited stream:

comprises composited frames that each comprise a time-stamped n-dimensional image corresponding to a single instant in time, aligns the rendered frame content with the additional data to record content for the plurality of instants in time, and comprises another viewpoint of the recorded content for a viewer, wherein the another viewpoint is a different viewpoint than the at least two different viewpoints rendered during the user experience.

* * * * *